United States Statutory Invention Registration [19]

[11] Reg. Number: H840

Efron et al. [43] Published: Nov. 6, 1990

[54] SINGLE-SCHOTTKY DIODE LIQUID CRYSTAL LIGHT VALVE AND METHOD

[75] Inventors: Uzi Efron, Los Angeles; Paul O. Braatz, Canoga Park; Jan Grinberg, Los Angeles, all of Calif.

[73] Assignee: The United States of America as represented by the Secretary of the Air Force, Washington, D.C.

[21] Appl. No.: 294,611

[22] Filed: Jan. 9, 1989

[51] Int. Cl.[5] ..... G02F 1/13

[52] U.S. Cl. ..... 350/320; 350/334; 350/342

[58] Field of Search ..... 350/320, 342, 334, 350 R, 350/333; 340/784, 805

[56] References Cited

U.S. PATENT DOCUMENTS

| | | | |
|---|---|---|---|
| 4,128,312 | 12/1978 | Lim et al. | 350/350 R X |
| 4,191,454 | 3/1980 | Braatz et al. | 350/342 |
| 4,228,449 | 10/1980 | Braatz | 357/30 |
| 4,705,345 | 11/1987 | Ayliffe et al. | 350/333 X |
| 4,807,976 | 2/1989 | Little et al. | 350/342 X |

FOREIGN PATENT DOCUMENTS

| | | | |
|---|---|---|---|
| 2227547 | 11/1974 | France | 350/342 |
| 87/00642 | 1/1987 | PCT Int'l Appl. | 350/342 |
| 87/00643 | 1/1987 | PCT Int'l Appl. | 350/342 |

OTHER PUBLICATIONS

Grinberg et al., "A New Real-Time Non-Coherent to Coherent Light Image Converter . . . ", Optical Engineering, vol. 14, No. 3, May-Jun. 1975, pp. 217-225.

Grinberg et al., "Photoactivated Birefringent Liquid--Crystal Light Valve for Color Symbology Display", IEEE Transactions Electronic Devices, ED-22, 1975, pp. 775-783.

U. Efron et al., "Silicon Liquid-Crystal Light Valve", Journal of Applied Physics, vol. 57(4), Feb. 1985, pp. 1356-1368.

*Primary Examiner*—Thomas H. Tarcza
*Assistant Examiner*—Linda J. Wallace

[57] ABSTRACT

A single-Schottky liquid crystal is disclosed in which a series of Schottky contacts are made on one side of a photoconductor substrate by a metal matrix mirror, with a doped semiconductor back contact electrode on the other side of the substrate. The light valve offers several operational advantages over MOS devices, and is easier to fabricate than double-Schottky light valves. It can be operated either in an AC mode or, by doping the liquid crystal ions, in a DC mode.

2 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SINGLE-SCHOTTKY DIODE LIQUID CRYSTAL LIGHT VALVE AND METHOD

GOVERNMENT RIGHTS IN INVENTION

This invention was made with U.S. Government support under Contract No. F 33615-83-C-1057. The U.S. Government has certain rights in this invention.

This is a division of application Ser. No. 095,806, filed Sept. 14, 1987.

BACKGROUND OF THE INVENTION

1. Field of the Invention

This invention relates to liquid crystal light valves, and more particularly to light valves which are based upon a depletion of majority carriers in a photoconductor layer, and methods of operating the same.

2. Description of the Related Art

Light valves, generally employing liquid crystals as an electro-optic medium, are used to spatially modulate a readout beam in accordance with an input signal pattern applied to the light valve. They can be used to greatly. amplify the input pattern by controlling a readout beam of much greater intensity, to convert spatially modulated incoherent input radiation to a coherent readout laser beam with a similar spatial modulation, for optical data processing, wavelength conversion, or for other purposes that involve the conversion of an input signal pattern to a corresponding spatial modulation on a separate readout beam.

A simplified block diagram of a typical light valve system is illustrated in FIG. 1. An input beam 2 is developed from a source such as the screen of a cathode ray tube 4 and imaged through lens 6 onto the input side of a light valve 8. On the other side of the light valve a readout beam 10 is generated by a laser 12, and directed onto the readout side of the light valve by a polarizing beam splitter 14. The input beam 2 establishes a spatial polarization of a liquid crystal layer within the light valve 8, and this layer controls the reflection of the readout beam from the light valve. Certain portions of the readout beam are incident upon locations in the liquid crystal layer where the liquid crystal molecules have been rotated in response to the voltage generated by the input radiation, and these portions are retro-reflected back through beam splitter 14 to emerge as an output beam 16. In this example, the liquid crystal in the light valve modulates the spatial intensity of the readout beam into a corresponding but amplified intensity pattern of the input beam.

The main parameters of light valves are the input sensitivity, output, and resolution modulation (contrast ratio), as well as output uniformity and frame rate. While high contrast, moderate brightness and color capability are required for command and control displays, very high brightness and resolution, as well as fast response, are required for flight-simulation applications. Optical data processing applications require low wavefront distortion (output uniformity) and high diffraction efficiency. In addition, for real-time portable scene correlators, high frame rate, wide spectral range, small size, and low power consumption are also required. Most of these requirements are met by a cadmium sulfide liquid crystal light valve developed by Hughes Aircraft Company. This device is described in articles by J. Grinberg, A. Jacobson, W. P. Bleha, L. Miller, L. Fraas, D. Boswell and G. Myer, "A New Real-Time Non-Coherent to Coherent Light Image Converter—The Hybrid Field Effect Liquid Crystal Light Valve", Optical Engineering 14, 217 (1975), and J. Grinberg, W. P. Bleha, A. Jacobson, A. M. Lackner, G. Myer, L. Miller, J. Margerum, L. Fraas and D. Boswell, "Photoactivated Birefringent Light-Crystal Light Valve for Color Symbology Display", IEEE Transactions Electronic Devices ED-22, 775 (1975).

The main drawback of the CdS-based light valve has been its slow response time. A second generation silicon-based liquid crystal light valve has been developed which retains the advantages of the CdS-based light valve and has a considerably faster response time. The silicon-based device employs a metal-oxide-semiconductor (MOS) structure, and is described in an article by U. Efron, J. Grinberg, P. O. Braatz, M. J. Little, P. G. Reif and R. N. Schwartz, "The Silicon-Liquid Crystal Light Valve", Journal of Applied Physics 57(4) 1356–68 (1985). This article also summarizes some of the prior light valve efforts.

The internal construction of an MOS light valve is shown in FIG. 2. An input image beam on the right hand side of the device is identified by reference numeral 18, while a readout beam 20 is directed onto, and reflected from, the left hand side of the device. A layer of high resistivity silicon photoconductor 22 has a thin $p^+$ back contact layer 24 formed on its readout side. This back contact provides a high sheet conductivity to present a very small load at any point in the device's cross-section where carriers are generated. An $SiO_2$ oxide layer 26 is provided on the input side of back contact 24, with a fiber optic plate 28 adhered to the oxide layer by means of an optical cement 30. A DC-biased n-type diode guard ring 32 is implanted at the opposite edge of the silicon photoconductor wafer 22 from back contact 24 to prevent peripheral minority carrier injection into the active region of the device. An $SiO_2$ gate insulator layer 34 is formed on the readout side of the silicon photoconductor wafer 22. Isolated potential wells are created at the $Si/SiO_2$ interface by means of an n-type microdiode array 36. This prevents the lateral spread of signal electrons residing at the interface.

A unified thin film dielectric mirror 38 is located on the readout side of the oxide layer 34 to provide broadband reflectivity, as well as optical isolation to block the high intensity readout beam from the photoconductor. A thin film of fast response liquid crystal 40 is employed as the light modulating electro-optic layer on the readout side of mirror 38. A front glass plate 42 is coated with an indium tin oxide (ITO) counter-electrode 44 adjacent the liquid crystal. The front of glass plate 42 is coated with an anti-reflection coating 46, and the whole structure is assembled within an airtight anodized aluminum holder.

Silicon photoconductor 22 is coupled with oxide layer 34 and transparent metallic electrode coating 44 to form an MOS structure. The combination of the insulating liquid crystal, oxide and mirror act as the insulating gate of the MOS structure.

In operation, an alternating voltage source 48 is connected on one side to back.. contact 24 by means of an aluminum back contact pad 49, and on its opposite side to counter-electrode 44. The voltage across the two electrodes causes the MOS structure to operate in alternate. depletion (active) and accumulation (inactive) phases. In the depletion phase, the high resistivity silicon photoconductive layer 22 is depleted and electronhole pairs generated by input light beam 18 are swept by the electric field in the photoconductor, thereby producing a signal current that activates the liquid crystal. The electric field existing in the depletion region acts to sweep the signal charges from the input side to the readout side, and thus preserve the spatial resolution of the input image. The polarized readout beam 20 enters the readout side of the light valve through glass layer 42, passes through the liquid crystal layer, and is retro-reflected by dielectric mirror 38 back through the liquid crystal. Since the conductivity of each pixel in photoconductive layer 22 varies with the intensity of input beam 18 at that pixel, a voltage divider effect results which varies the voltage across the corresponding pixel of the liquid crystal in accordance with the spatial intensity of the input light. As is well known, the liquid crystals at any location will orient themselves in accordance with the impressed voltage, and the liquid crystal orientation relative to the readout light polarization at any particular location will determine the amount of readout light that will be reflected back off the light valve at that location. Thus, the spatial intensity pattern of the input light is transferred to a spatial liquid crystal orientation pattern in the liquid crystal layer, which in turn controls the spatial reflectivity of the light valve to the readout beam.

Active light valve operation takes place only during the depletion phases. It is necessary to reverse the polarity of the applied voltage and thereby intersperse shorter accumulation periods between the depletion periods to prevent any appreciable DC current through the liquid crystal. This is because the liquid crystal tends to decompose under a DC current.

Since the photoconductor layer 22 is photosensitive, a dielectric mirror/light blocking layer 38 is required that will prevent the high intensity readout light from generating spatially unresolved carriers in the photoconductor that would otherwise swamp the signal charge. Typically, the dielectric mirror/light blocking layer 38 must attenuate the readout beam by a factor of about $10^6$ or larger, so that the number of carriers accumulated during the active phase due to light leakage through the dielectric mirror/light blocking layer does not approach or exceed the signal charge. It is quite difficult to fabricate a dielectric mirror with this capability. Although an attenuation of $10^7$ has been achieved, some applications require greater attenuations, for which adequate dielectric mirrors are not presently available.

As a possible substitute for a dielectric mirror, a recently developed metal matrix mirror has been demonstrated to provide excellent electrical and optical properties for valves operating in the infrared region. This type of mirror is described in the co-pending U.S. patent application Ser. No. 759,004, "Reflective Matrix Mirror Visible to Infrared Convertor Light Valve" by P. O. Braatz, and assigned to Hughes Aircraft Company.

A metal matrix mirror is illustrated in FIG. 3. A matrix of reflective islands 52 is formed on an insulative layer 54 such as $SiO_2$. The islands 52 are separated from each other by insulating channels so as to avoid short-circuits across the face of the mirror. The dimensions of the individual islands 52 are determined from a minimum size for adequate reflection, on the order of 5–20 microns, and the resolution or pixel element size for which the light valve is designed. The thickness of the islands depends upon the specific reflective material employed. There is a basic requirement that the free electron density of the reflective material be sufficient to interact with the readout radiation and scatter it back out of the material. Metals such as aluminum or silver or metal/semiconductor compounds such as platinum-silicide may be used.

The MOS light valve described above has several limitations. While the photoconductor is initially deeply depleted, the depletion region gradually collapses (over the order of tens of milliseconds) because of thermal generation effects which deplete the majority carriers. Eventually the voltage drop shifts to the oxide from the photoconductor. Also, the process for applying the $SiO_2$ layer requires high temperatures in the order of 1000° C. At these temperatures it is difficult to keep the light valve substrate perfectly flat. Any curvature or waviness in the substrate will distort the readout from the valve. Another disadvantage is that a certain amount of sheet conductivity has been noted at the $Si/SiO_2$ interface. This effect degrades both the resolution and the dynamic range of the device. Furthermore, while a metal matrix mirror is preferable to a dielectric mirror because of its lower impedance, its use has been limited principally to the infrared region. In the visible region the readout light leaks through the channels between the metal islands, causing activation at the underlying photoconductor.

Another type of light valve which is at least potentially capable of even better performance than the MOS light valve is referred to as the double Schottky diode light valve. It is disclosed in a co-pending patent application entitled "Double-Schottky Diode Liquid Crystal Light Valve" by Paul O. Braatz and Uzi Efron, two of the present inventors. The application was filed on July 25, 1985 under Ser. No. 758,917, and is assigned to Hughes Aircraft Company, the assignee of the present invention. This device is illustrated in FIG. 4. It consists of a photoconductor substrate 58 with Schottky diodes formed on either side. On the readout side the metal pads 60 of a metal matrix mirror form a pattern of Schottky contacts with the photoconductor, while on the input side a metal electrode 62 contacts the phase of the photoconductor to form another Schottky diode. A face plate 64 is attached to the input side of electrode 62 by an optical cement 66.

The liquid crystal layer 68, counter-electrode 70 and glass counter-electrode substrate 72 are similar to the MOS device described above. Alignment layers 74 and 76 are provided on either side of the liquid crystal, which is confined by spacers 78.

In contrast to the operation of the MOS device with relatively long depletion and relatively short accumulation periods, the double-Schottky diode light valve is operated with a balanced AC voltage drive 80 applied across the back electrode 62 and counter-electrode 70. In operation, one or the other of the Schottky diodes will be reverse biased at substantially all times, depending on the phase of the voltage source 80 at any given time. This causes the photoconductor 58 to maintain a state of substantially continuous depletion. Thus, the device avoids the inactive accumulation periods necessary with the MOS light valve, and inherently balances the net current through the liquid crystal to zero. It can be fabricated at a much lower temperature than the MOS device, and does not exhibit the sheet conductivity at the photoconductor surface that degrades the MOS operation. However, the metallic back contact 62 has been very difficult to fabricate and has prevented the full realization of the double-Schottky device's potential.

SUMMARY OF THE INVENTION

In view of the above problems, the purpose of the present invention is to provide a liquid crystal light valve that retains the benefits of the double-Schottky diode light valve, avoids the depletion region collapse, high temperature fabrication and sheet conductivity problems of the MOS light valve, and yet is more practical to fabricate than a double-Schottky diode device.

These purposes are achieved with a single Schottky diode light valve in which a Schottky contact is made with the readout side of the photoconductor by means of a metal matrix mirror, while the back contact is established by a doped semiconductor electrode. The device can be operated in an AC mode with relatively long depletion periods and shorter inactive periods, or the liquid crystal can be doped with current carrying ions for DC operation with continuous depletion. For operation in the visible range, a dielectric mirror can be provided behind the metal matrix mirror, or the insulating channels of the metal matrix mirror can be coated with an opaque material. The device avoids the depletion region collapse which characterizes MOS light valves, and is easier to successfully fabricate than either MOS or double-Schottky devices.

These and other features and advantages of the invention will be apparent to those skilled in the art from the following detailed description of preferred embodiments, taken with the accompanying drawings, in which:

DETAILED DESCRIPTION OF PREFERRED EMBODIMENTS

Figure 1:
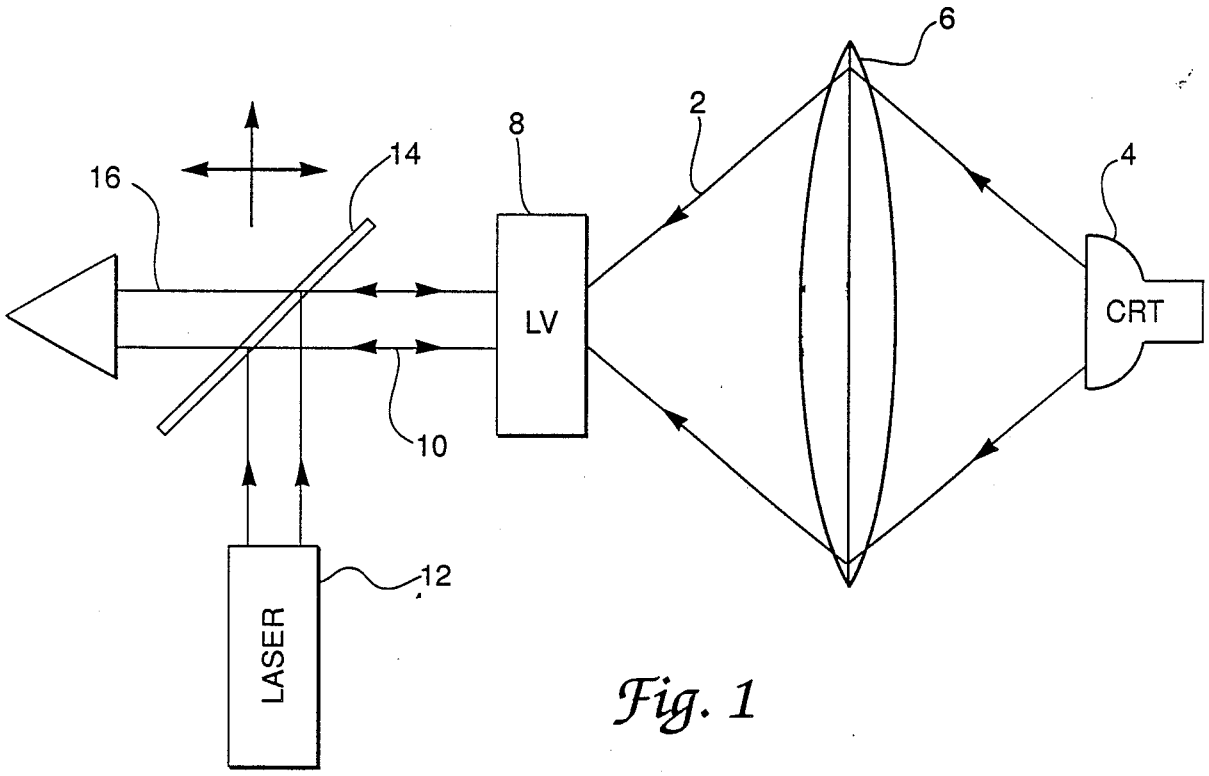
FIG. 1, described above, is a block diagram of a conventional light valve system.
Figure 2:
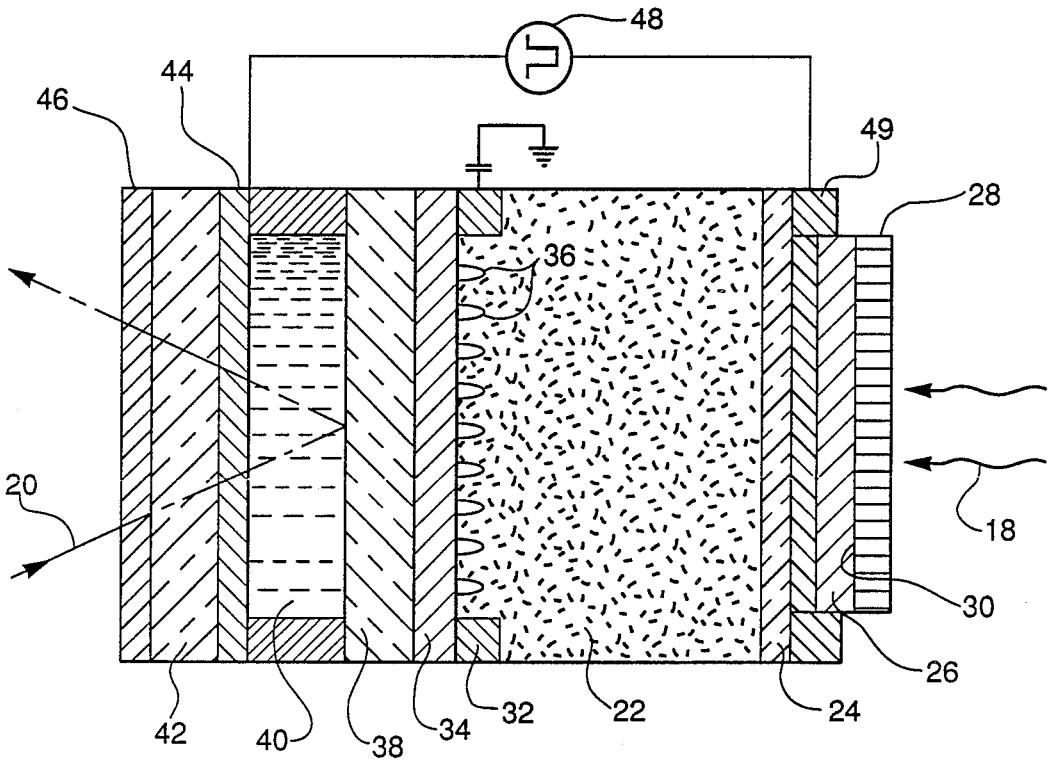
Fig. 2 (PRIOR ART)
FIG. 2, described above, is a sectional view of a prior art MOS liquid crystal light valve.
Figure 3:
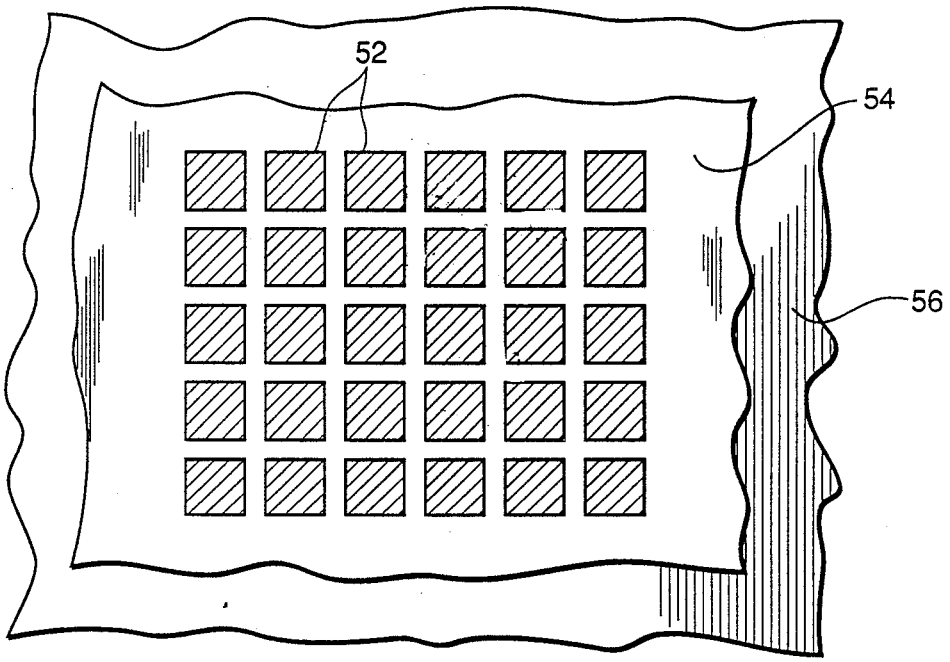
FIG. 3, described above, is a plan view of a metal matrix mirror structure.
Figure 4:
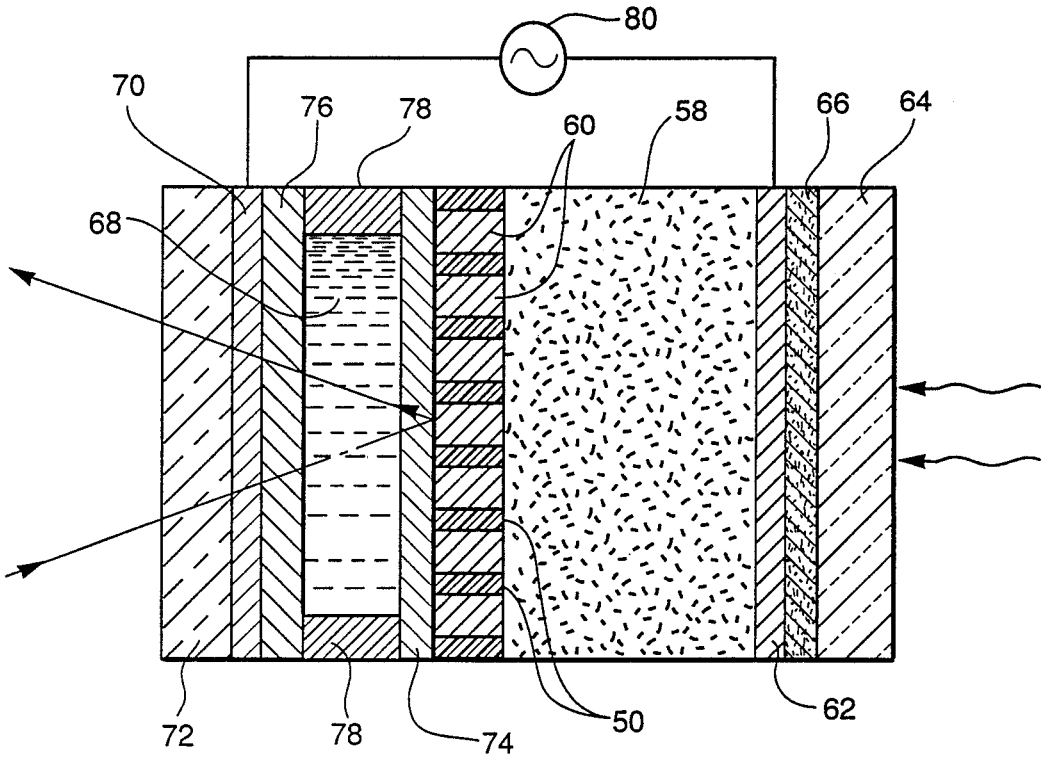
FIG. 4, described above, is a sectional view of a double-Schottky liquid crystal light valve.
Figure 5:
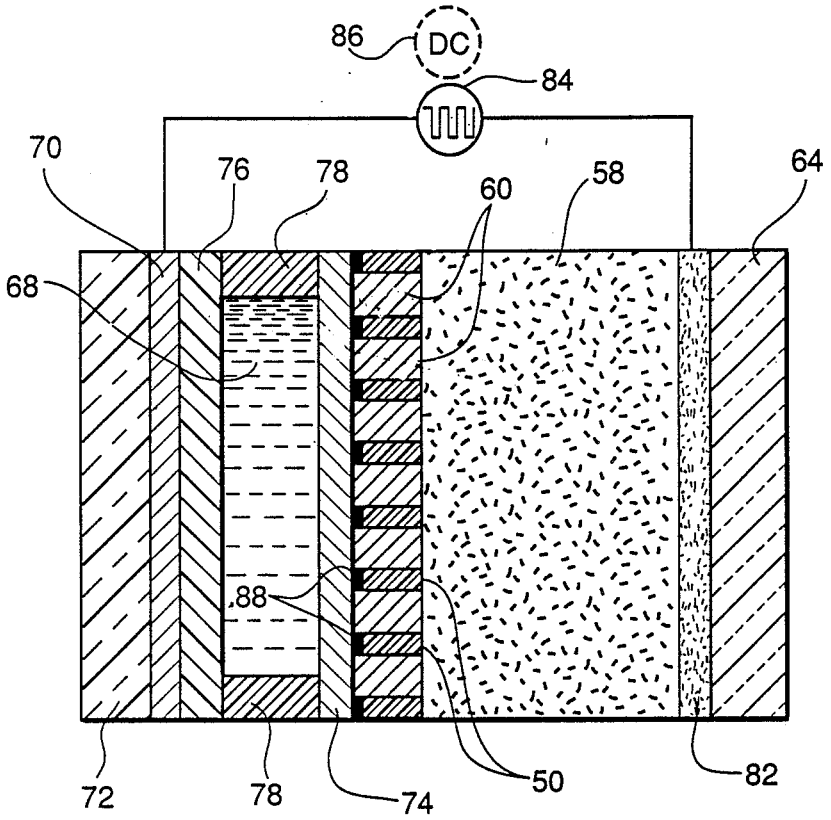
FIG. 5 is a sectional view of one embodiment of the present invention.

One embodiment of the light valve of the present invention is shown in FIG. 5. It is similar to the double-Schottky light valve of FIG. 4 in certain respects, and common elements are identified by the same reference numerals. It includes a liquid crystal layer 68 confined by alignment layers 74 and 76 and by spacers 78, a counter-electrode 70 on glass substrate 72, a semiconductor photoconductor layer 58 which is preferably of silicon but may also be gallium arsenide, indium arsenide or indium phosphide, a metal matrix mirror 60 between the liquid crystal layer and photoconductor, and an input face plate 64.

As with the double-Schottky device, metal matrix mirror pads 60 form a series of Schottky contacts on one side of the photoconductor layer 58. On the other side of the photoconductor, however, a back contact electrode 82 formed from heavily n-doped silicon is provided. An alternating voltage from source 84 is applied across electrodes 70 and 82 to operate the device. Alternately, the device can be operated in a DC mode with a DC voltage source 86 by doping the liquid crystal with current carrying ions. See for example, U.S. Pat. No. 4,066,569, "Dopants For Dynamic Scattering Liquid Crystals" issued 1978 to H. S. Lim. For operation in the visible light region, light leakage through the channels 50 can be blocked by means of a commercially available opaque, high resistivity blocking material 88, such as GaAs or CdTe, inset in the readout end of each channel.

The described single-Schottky light valve has several distinct advantages over MOS devices. Minority carriers in the photoconductor are attracted to the junction with the metal matrix mirror and can flow across the junction into the mirror, thereby preventing a collapse of the depletion region. The avoidance of an insulating oxide layer, which is fabricated at about 1000° C. for $SiO_2$, allows for a much cooler fabrication with maximum temperatures of about 300°–400° C. This results in a flatter device and an accordingly improved readout. The sheet conductivity exhibited by MOS devices at the $SiO/SiO_2$ interface is eliminated, thereby improving resolution and dynamic range. Also, the use of lattice-damaging processing steps such as ion implantation and thermal oxide growth is avoided.

Figure 6:
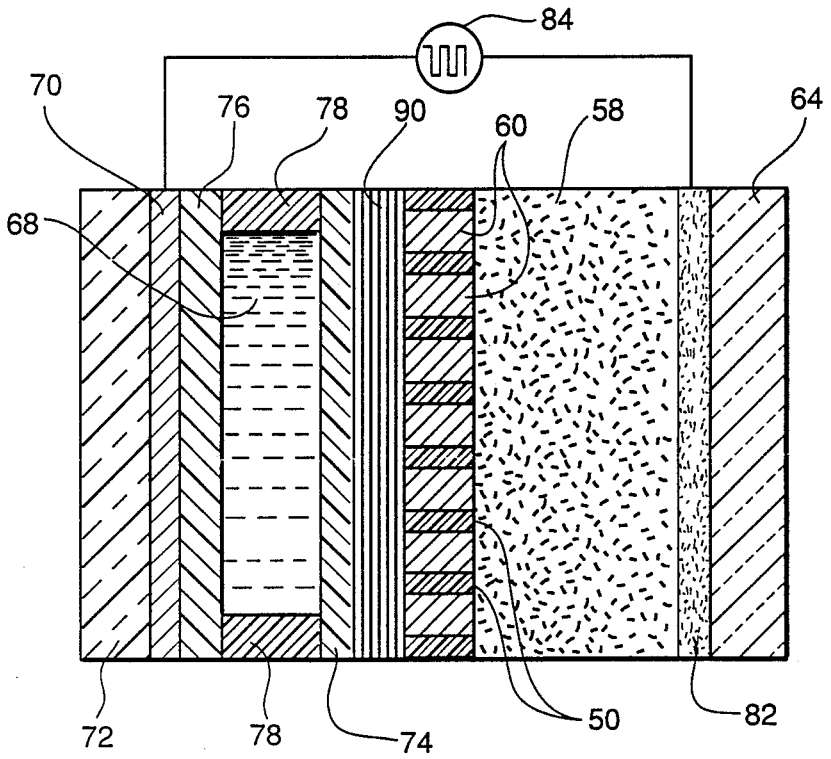
FIG. 6 is a sectional view of the light valve of FIG. 5 with the addition of a dielectric mirror.

Another embodiment of the invention is shown in FIG. 6. This embodiment is essentially similar to that of FIG. 5, except a dielectric mirror 90 is provided on the readout side of the metal matrix mirror 60 to prevent leakage of visible readout light into the photoconductor 58. .This eliminates the use of the channel blocking material 88 of FIG. 5. For operation in non-visible regions such as infrared, both blocking mechanisms can be omitted since leakage of the readout radiation into the photoconductor will not interfere with the operation of the device.

Figure 7A:
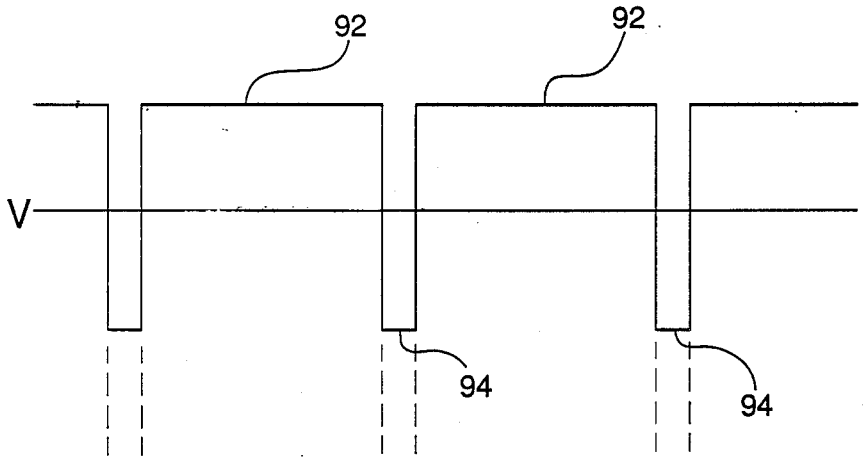
FIGS. 7(*a*) and 7(*b*) are graphs of the applied voltage and the liquid crystal current, respectively, during AC operation.
Figure 7B:
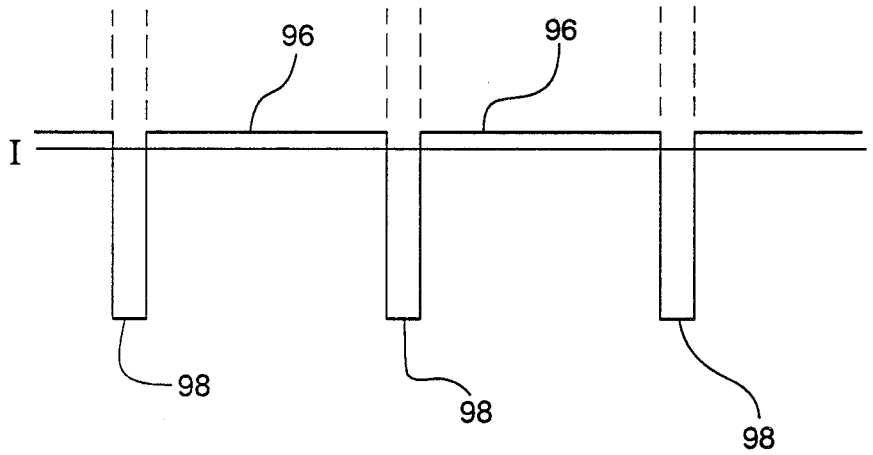

The asymmetric AC operation of the device is illustrated in FIGS. 7(*a*) and 7(*b*). The voltage applied by source 84 across the electrodes, shown in FIG. 7(*a*), consists of relatively long reverse biasing pulses 92, typically on the order of about 1 millisecond and 20 volts, are alternated with much shorter forward biasing pulses 94 in the order of 0.1 milliseconds across the Schottky contacts established by the photoconductor and the metal matrix mirror. Since the forward bias impedance of the Schottky barrier is negligible compared to the reverse bias, the above biasing conditions will result in virtual charge transfer compensation, assuming a 10:1 ratio of effective Schottky impedance (in depletion) to that of the liquid crystal/mirror impedance.

The resulting current pattern through the device is illustrated in FIG. 7(*b*). During reverse biasing there will be a relatively low level current pulse 96 which lasts for a relatively long period of time, with intervening shorter but correspondingly higher magnitude current pulses 98 in the opposite direction during forward biasing. The forward bias current pulses are necessary to balance the net current through the liquid crystal to approximately zero. This is necessary because the liquid crystal will decompose under a DC current. If the liquid crystal is doped with current carrying ions as mentioned above, the ions will carry the DC current through the liquid crystal and the light valve can be operated with a DC drive voltage as mentioned above.

In fabricating an exemplary embodiment of the light valve, a high resistivity n-type silicon wafer is first double-side lapped and chemo-mechanically thinned down to a thickness of about 250 microns. A typical resistivity is in the range of 0.5–3K ohms-cm. An n-type doping layer is then formed at the back of the wafer by either implanting or diffusing a suitable donor impurity, such as phosphorous or arsenic, to yield a sheet resistivity less than 10 ohms per square. The wafer is then glued with optical cement or electro-bonded to a glass substrate, which may be a single glass or a quartz plate. Alternately, a fiber optic face plate can be used for display and adaptive optics applications.

The mounted wafer is next thinned down using chemo-mechanical lapping to a thickness of between 30 and 60 microns, and its surface polished with a high optical quality polish. A low temperature insulator such as CVD oxide, plasma oxide, photo-oxide or low temperature silicon nitride is next deposited over the wafer surface. Alternately, the insulating material may be chosen to have a high light absorption coefficient, such as CdTe.

The next step is the formation of the metal matrix mirror. A grid pattern is formed on the substrate by photolithography, in which the grid (channel) lines have a typical width of 2–5 microns and a periodicity of 10–20 microns. The inner regions of the grid are then etched away, exposing the n-silicon substrate in these regions. The insulator material is left in place in the channel (grid) lines. A Schottky metal is then evaporated into the areas where the grid has been etched away. Any metal such as Pt with a high work function for n-type materials can be used. The photoresist in the grid lines is then lifted to remove the metal from the grid lines, completing the metal matrix array.

In the case of non-absorbing grid channels such as oxide channels, a dielectric mirror tuned to the spectral width of the desired readout beam is deposited on the Schottky matrix array to prevent readout beam penetration through the grid lines.

To minimize DC current flow through the light valve, two alternate methods can be employed. First, an insulating low-temperature oxide can be formed on the counter-electrode 70. Secondly, an external capacitor can be used. Alignment layers are next formed on both the substrate and the counter-electrode using medium and shallow angle deposition. Finally, the light valve is assembled in a standard holder assembly and the liquid crystal introduced.

The described light valve has significant operational advantages over MOS light valves, and is easier to fabricate than double-Schottky devices. While particular embodiments have been shown and described, numerous variations and alternate embodiments will occur to those skilled in the art. Accordingly, it is intended that the invention be limited only in terms of the appended claims.

We claim:

1. A method of operating a liquid crystal light valve, comprising, providing a liquid crystal light valve having a liquid crystal layer, a doped semiconductor photoconductor layer, a Schottky diode means in contact with the photoconductor layer between the liquid crystal and photoconductor layers, a doped semiconductor layer electrically contacting the opposite side of the photoconductor layer from the Schottky diode means, and a counter-electrode on the opposite side of the liquid crystal layer from the photoconductor layer, and applying an alternating voltage across the electrode and counter-electrode to operate the light valve in spaced periods of reverse bias on the Schottky diode means and substantial majority carrier depletion of the photoconductor layer, and intervening substantially shorter periods of forward bias on the Schottky diode means sufficient to substantially balance the current flow through the liquid crystal layer.

2. A method of operating a liquid crystal light valve, comprising:

providing a liquid crystal light valve having a liquid crystal layer which is doped with current carrying ions, a doped semiconductor photoconductor layer, a Schottky diode means in contact with the photoconductor layer between the liquid crystal and photoconductor layers, a doped semiconductor layer electrically contacting the opposite side of the photoconductor layer from the Schottky diode means, and a counter-electrode on the opposite side of the liquid crystal layer from the photoconductor layer, and applying a substantially DC voltage across the electrode and counter-electrode to operate the light valve with the Schottky diode means substantially continuously reverse biased.

* * * * *